United States Patent [19]

Garvey et al.

[11] Patent Number: 5,401,588

[45] Date of Patent: Mar. 28, 1995

[54] GYPSUM MICROFIBER SHEET MATERIAL

[75] Inventors: Chad E. Garvey, Ball Ground; David A. Hutchings, Tucker; Ted McC. McVay, Stone Mountain; Richard F. Pennock, Decatur, all of Ga.

[73] Assignee: Georgia-Pacific Resins Inc., Atlanta, Ga.

[21] Appl. No.: 170,920

[22] Filed: Dec. 21, 1993

Related U.S. Application Data

[63] Continuation-in-part of Ser. No. 995,389, Dec. 23, 1992, abandoned.

[51] Int. Cl.⁶ ............................................. B32B 9/00
[52] U.S. Cl. ............................ 428/703; 428/172; 428/195; 428/285; 428/312.4; 428/393; 428/411.1; 428/425.1; 428/537.7; 428/920; 428/921; 52/317; 52/443
[58] Field of Search ............... 428/411.1, 70, 425.1, 428/921, 537.7, 172, 195, 281, 288, 404, 393, 312.4, 703, 285, 920; 52/443, 481, 317

[56] References Cited

U.S. PATENT DOCUMENTS

| | | | |
|---|---|---|---|
| 1,790,839 | 2/1931 | Richter | 106/109 |
| 1,887,726 | 2/1932 | Weber | 106/109 |
| 2,631,138 | 2/1951 | Dannenberg | 106/110 |
| 2,681,863 | 6/1954 | Croce et al. | 106/109 |
| 2,744,022 | 5/1956 | Croce et al. | 106/110 |
| 2,773,763 | 12/1956 | Scott | 106/109 |
| 2,901,390 | 8/1959 | Conklin et al. | 106/110 |
| 3,494,824 | 2/1970 | Roberts | 106/110 |
| 3,562,097 | 2/1971 | von Hazmburg | 106/110 |
| 3,822,340 | 7/1974 | Eberl et al. | 423/555 |
| 3,952,130 | 4/1976 | Nason | 423/55.8 |
| 3,961,105 | 6/1976 | Eberl et al. | 427/220 |
| 4,029,512 | 6/1977 | Jaunarajs et al. | 106/109 |
| 4,090,883 | 5/1978 | Rauschenfels | 106/110 |
| 4,129,674 | 12/1978 | Hannes et al. | 156/89 |
| 4,152,408 | 5/1979 | Winslow | 106/109 |
| 4,169,914 | 10/1979 | Gallacher | 427/220 |
| 4,233,368 | 11/1980 | Baehr et al. | 427/220 |
| 4,265,979 | 5/1981 | Baehr et al. | 427/220 |
| 4,419,400 | 12/1983 | Hindersinn | 156/89 |
| 4,487,657 | 12/1984 | Gomez | 162/158 |
| 4,532,006 | 7/1985 | Winters et al. | 427/220 |
| 4,637,951 | 1/1987 | Gill et al. | 156/89 |
| 4,647,486 | 3/1987 | Ali | 428/70 |
| 4,664,707 | 5/1987 | Wilson et al. | 427/220 |
| 4,722,866 | 2/1988 | Wilson et al. | 427/220 |
| 4,785,040 | 11/1988 | Gupta et al. | 423/555 |
| 4,794,051 | 12/1988 | Gupta | 156/890 |
| 4,810,569 | 3/1989 | Lehnert et al. | 423/555 |
| 4,818,287 | 4/1989 | Ravins et al. | 428/688 |
| 4,853,085 | 8/1989 | Johnstone et al. | 428/537.7 |
| 4,873,128 | 10/1989 | Ma et al. | 428/689 |
| 5,001,005 | 3/1991 | Blanpied | 156/89 |
| 5,015,529 | 5/1991 | Gupta | 427/220 |
| 5,041,333 | 8/1991 | Conroy | 427/229 |
| 5,098,521 | 3/1992 | Freudenberg et al. | 156/89 |
| 5,100,474 | 3/1992 | Hawkins | 428/688 |
| 5,148,645 | 9/1992 | Lehnert et al. | 428/688 |

FOREIGN PATENT DOCUMENTS

| | | |
|---|---|---|
| 2429291 | 7/1978 | France . |
| 77-63755 | 5/1977 | Japan . |
| 7845540 | 11/1978 | United Kingdom . |
| 8015586 | 12/1978 | United Kingdom . |

*Primary Examiner*—Patrick J. Ryan
*Assistant Examiner*—Abraham Bahta
*Attorney, Agent, or Firm*—Banner, Birch, McKie & Beckett

[57] ABSTRACT

The novel composition of the present invention comprises a paper-like sheet material or a non-woven mat which contains water-insoluble gypsum anhydrite microfibers and a cellulosic binder, such as cellulose fibers, optionally with glass fibers, which has surprising fire-retardant properties. Typical paper processing methods or wet process mat techniques are utilized in preparing this material. The flexible gypsum microfiber sheet or mat of this invention may be used as microfiber insulation, particularly in a fire retardant barrier.

20 Claims, 3 Drawing Sheets

GYPSUM MICROFIBER SHEET MATERIAL

CROSS-REFERENCE TO RELATED APPLICATIONS

This application is a continuation-in-part of applicants application U.S. Ser. No. 07/995,389, filed Dec. 23, 1992, now abandoned.

FIELD OF THE INVENTION

This invention broadly relates to fire resistant underlayments, facings or matricies for materials used in the building and construction industries. More particularly, there is provided a gypsum microfiber sheet material or mat which can be used for underlayment composites or in composite fire resistant barrier systems and methods for making such sheet material or mat products.

BACKGROUND OF THE INVENTION

Gypsum is a naturally occurring mineral typically found in old salt-lake beds, volcanic deposits and clay beds in the form of calcium sulfate dihydrate ($CaSO_4 \cdot 2H_2O$). Gypsum is also formed as a by-product of various industrial processes such as, for example, the manufacture of titanium dioxide and the desulfurization of flue gases. Calcining, that is, heating the mineral to about 120° C. drives off $1\frac{1}{2}$ molecules of water, leaving behind calcium sulfate hemihydrate ($CaSO_4 \cdot \frac{1}{2}H_2O$). Anhydrous calcium sulfate ($CaSO_4$) can be produced by heating to a temperature of about 163° C. Either of these forms of gypsum, referred to herein as "calcined gypsum", is capable of reacting with water to form calcium sulphate dihydrate, which is referred to herein as "set calcined gypsum."

Fire resistant gypsum board, commonly used as wall and ceiling partitions, consists of a stiff or rigid core of set calcined gypsum, usually about $\frac{1}{2}$ or about $\frac{5}{8}$ inch thick, sandwiched between two paper liners which form the outer surfaces of the board. Speaking generally, the core of fire resistant gypsum board is made from an aqueous slurry of calcined gypsum which has set to form a hard, fairly rigid product. Gypsum also is used in one or more layers of fire resistant barrier systems for roof coverings. One such system uses gypsum board in combination with glass fiber mats.

Fire resistant gypsum board must have certain basic properties in order to meet accepted standards which dictate whether the board is suitable for commercial use. When exposed to intense heat, such as that generated by fire in a burning building, the board, which is extensively used for constructing walls and ceilings, is expected to stay in place for a defined length of time where it functions to deter the spread of fire. Such properties are evaluated in fire resistant assembly tests which have been adopted by the industry. When subjected to standard fire resistant tests which simulate conditions in a burning building, it is not unusual for commercially available fire resistant board to remain in place for one to two hours during which time it is exposed to temperatures as high as 1850° F.

Non-woven fiber mats may also be utilized as fire resistant backing sheets for materials such as doors, carpets or vinyl fabrics. The relative degree of fire resistance provided by fiber mats depends upon numerous factors, including the size and composition of the fibers, and the composition of the binder. However, these factors also contribute to the functional properties of the mat. Thus, the prior art in considering the development of a fire resistant mat considered the functional properties thereof in addition to the degree of fire resistance desired.

Moreover, compliance with various fire resistance testing methods is an important consideration in developing fire resistant mats or barrier systems because many regulatory agencies and building codes rely on these tests in determining the acceptance of building materials used in various applications. Insurance rates may also be affected by compliance with fire resistance testing methods. One of these widely accepted classifications for fire resistance is the Underwriters Laboratories Inc. (UL) 790 Burning Brand Test. This test classifies flame resistance from Class A through Class C. Materials obtaining a Class A rating are the most fire resistant.

The Class A UL-790 Burning Brand Test simulates a burning tree branch falling onto a roof system in a twelve mile per hour wind. The "Brand" is a $12 \times 12 \times 2.25$ inch wood composite that is pre-ignited and placed on a test roof midsection at a prescribed location relative to a seam joining three plywood panels. The Class B test is similar, but utilizes two brands placed at two locations on the roof section considered most vulnerable. The Class B brands are each $6 \times 6 \times 2.25$ inch wood composite. The test is passed if the roof does not burn through and produce a self-sustained flame within 90 minutes. During the test, the roof system experiences temperatures approaching 2000° F.

Fire resistant barrier systems capable of meeting Class A UL-790 requirements are typically heavy, bulky, inflexible, difficult to use and costly. In a non-woven fiber mat or barrier system that is used as a fire resistant backing, it is desirable to obtain the optimum level of fire resistance without sacrificing the functional properties of the mat or the various components of the barrier system and at the same time reducing its weight and cost.

There remains a need for a light-weight fire resistant underlayment suitable for use in roofing systems and the like which can satisfy Class A and/or Class B UL-790 requirements.

SUMMARY OF THE INVENTION

An object of the present invention is to provide a flexible sheet material or mat that may be used as a flame retardant insulation layer, matrix layer or underlayment such as in fire resistant barrier systems. This and other objects are met by various embodiments of the invention described below.

This invention provides a flexible gypsum microfiber sheet material or mat made by forming and dewatering an aqueous slurry containing water-insoluble gypsum anhydrite microfibers and a cellulosic microfiber retention aid or binder into a sheet or mat and drying the formed sheet or mat. The cellulosic microfiber retention aid or binder used in preparing the flexible gypsum microfiber sheet of this invention generally will be selected from the group consisting of cellulose fibers, a cellulosic gel, a modified cellulose product such as carboxymethylcellulose, methylcellulose and the like, and mixtures thereof. Generally, the flexible gypsum microfiber sheet or mat of this invention will have a basis weight between about 5 and 100 grams per square foot (54 to 1076 grams per square meter), and more usually between about 10 and 75 grams per square foot (108 to 807 grams per square meter). A basis weight of above about 15 grams per square foot (161 grams per square meter) is preferred.

A characterizing aspect of the present invention is the use of water-insoluble gypsum anhydrite microfibers and optionally other inorganic fibers, e.g. glass fibers, to form a sheet or mat using a paper-making or a wet-laid mat-making process. In the broad practice of the present invention, the possible range of sheet or mat compositions runs from about 5-90% by weight of the gypsum microfibers, 0 to 90% by weight of other inorganic components (e.g. glass fibers) and a sufficient amount of the cellulosic component to form an integral sheet or web from the microfibers. The sheet or mat may range up to about 50% by weight cellulosic material. If cellulose fibers are not employed, then either a cellulose gel or another modified cellulose product such as carboxymethylcellulose or methylcellulose may be used as the cellulosic microfiber retention aid or binder.

As noted above, in one useful embodiment the flexible gypsum microfiber sheet material or mat of this invention also contains glass fibers, in addition to the gypsum microfibers themselves and the cellulosic microfiber retention aid or binder. Preferably, the flexible gypsum microfiber sheet material or mat will contain about 20 to 70% by weight of said gypsum microfibers, from about 10 to 30% by weight of the cellulosic microfiber retention aid or binder and from about 20 to 60% of glass fibers, wherein the weight ratio of cellulosic microfiber retention aid or binder to gypsum microfibers is less than about 1.0 to 1.3, and preferably is less than about 1.0 to 1.5. Particularly preferred are sheets or mats having a weight ratio of cellulosic microfiber retention aid or binder to gypsum microfibers of less than about 1.0 to 2.0.

The use of glass fibers in the sheet material or mat is particularly useful when the sheet or mat is intended for use as a component of a fire barrier system. Without the glass fibers, the performance of the fire resistant barrier system is somewhat degraded due to cracking of the sheet or mat under high temperature exposure.

The flexible gypsum microfiber sheet material or mat of this invention is useful as a microfiber insulation or underlayment, particularly in a multilayer fire retardant barrier. The insulation layer or underlayment of the present invention impedes heat transfer from a flame source to a flammable substrate due to the fibrous nature of the micro fiber array (low density with low contact area for heat transfer). The insulation layer also tends to limit any heat flux to a level below that required to melt a radiant reflective layer, e.g. aluminum foil, placed between the insulation layer and the flammable substrate.

DETAILED DESCRIPTION

Figure 1:
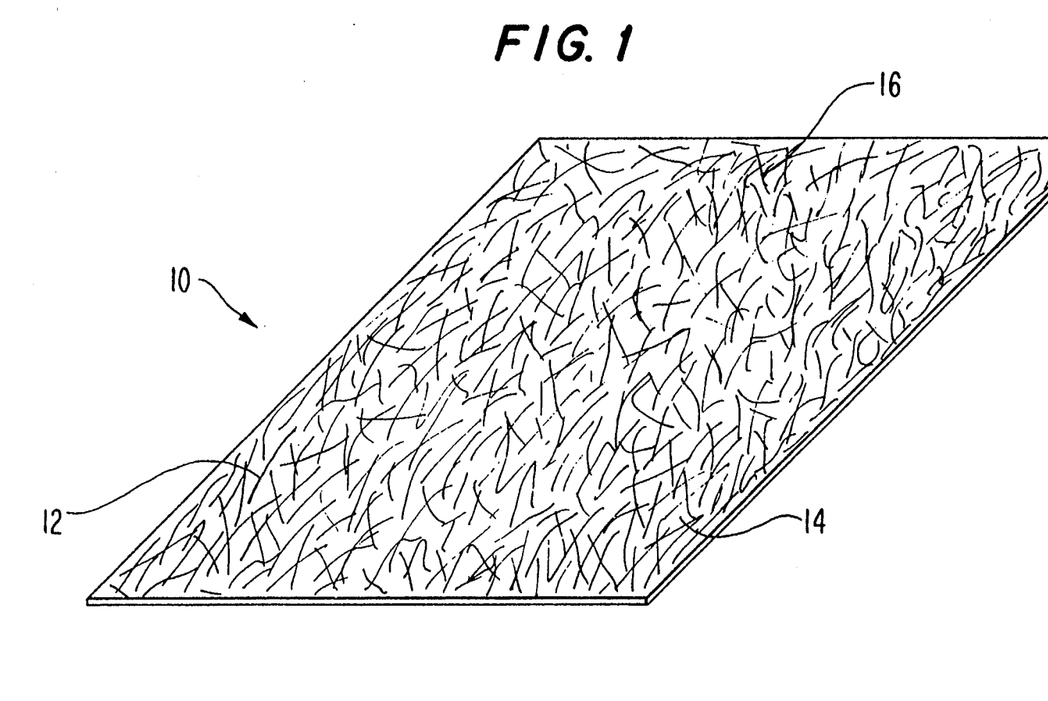
FIG. 1 is an exaggerated perspective view of a gypsum micro fiber sheet or mat prepared in accordance with the present invention.

With reference to FIG. 1, the product of the present invention is a paper-like sheet material or a non-woven mat 10 made with water-insoluble anhydrite gypsum microfibers 12 and a cellulosic microfiber retention aid or binder, such as cellulose fibers 14, a cellulose gel, or a modified cellulose material such as carboxymethylcellulose, methylcellulose or the like. The sheet material or mat optionally, although preferably, also contains other inorganic fibers, and especially glass fibers 16. The sheet material or mat has surprising fire-retardant/resistant properties. The paper-like sheet material can be prepared using typical paper processing methods; while the non-woven mat alternative can be made using the closely analogous conventional wet-laid mat techniques.

A novel aspect of the present invention is its use of a particular water-insoluble, gypsum anhydrite microfiber to form the paper-like sheet material or non-woven mat. The gypsum microfiber component of the present invention comprises needle-like crystals or fibers of calcium sulfate anhydrite which are substantially insoluble in water. Such insoluble gypsum anhydrite microfibers are known in the art and are to be distinguished from conventional calcined gypsum. See, for example, U.S. Pat. No. 4,152,408 (whisker fibers as reinforcement for organic polymeric resins, hydraulic cements, wood pulp and paper products); U.S. Pat. No. 4,029,512 (fibrous insoluble calcium sulfate anhydrite as reinforcement for hydraulic cement matrices such as Portland cement and organic polymeric matrices such as polyester and polypropylene); and U.S. Pat. No. 3,822,340 (whisker fibers as replacement for asbestos for insulating and fireproofing of buildings; use in structural units such as beams, sheathing, flooring and the like; as reinforcement for glass fibers; use in a fire resistant whisker fiber molded board product); see also, U.S. Pat. No. 4,664,707 to Wilson, et al.; U.S. Pat. No. 4,722,866 to Wilson, et al.; and U.S. Pat. No. 4,818,287 to Ravins, et al., the disclosures of which are all hereby incorporated by reference.

For purposes of the present invention, "microfibers" are defined as gypsum fibers having a mean diameter ranging from about 0.05 to about 3.5 microns, more typically from about 0.1 to about 0.7 microns. Preferably, the microfibers have a length to diameter ratio of at least about 6:1 and more usually from about 600:1 to about 10:1. The length to diameter ratio of the microfibers most often averages from about 20:1 to about 50:1. The average length of the microfibers can be controlled to some degree. Generally, the microfibers have an average length of less than about 0.05 inches. Normally, the microfibers have an average length of about 5 to about 300 microns, more usually about 20 to about 200 microns, and most often the fiber length averages from about 35 to about 45 microns. Procedures for determining the average diameters and lengths of particular batches of gypsum microfibers are well known to those skilled in the art and need not be repeated. The gypsum microfibers generally have a bulk density of about 7 pcf or less and a normal testing consistency of about 100 grams of fibers per 0.5 to 0.8 liter of water.

There are two basic differences between the microfiber component of the present invention and the standard calcined gypsum component from which conventional gypsum board core is made. Microfibers are generally long and thin, whereas the calcined gypsum component used to make board products primarily comprises irregularly shaped block-like crystals. Microfibers for use in the present invention also are substantially water-insoluble and do not readily convert to a hydrated form in the presence of moisture, whereas the conventional calcined gypsum component used to make gypsum board products readily rehydrates in the presence of moisture to form calcium sulfate dihydrate.

Generally speaking, suitable water-insoluble gypsum anhydrite (super anhydrite) microfibers can be prepared by heating an aqueous slurry of calcium sulfate dihydrate (gypsum) under pressure. Fibers usually form from the slurry initially as elongated thin crystals of calcium sulfate hemihydrate ($CaSO_4 \cdot \frac{1}{2}H_2O$), although recovery of whisker fibers in the dihydrate form also is reported in Japanese Patent Application No. 77-63755. Once recovered, the fibers are treated further by heating to an elevated temperature, usually about 200° C. and higher, to drive off the remaining chemically bound water. This leads first to the formation of soluble (rehydratable) anhydrous calcium sulfate whisker fibers. Heating still further, typically to a temperature above about 500° C., then renders the fibers substantially insoluble in water. Microfibers for use in the practice of the present invention are the insoluble calcium sulfate anhydrite fibers produced during the last stage of the aforedescribed process.

The second essential component of the sheet material or mat of the present invention is the cellulosic microfiber retention aid or binder. Unless this component is included in a sufficient sheet-forming or mat-forming amount in the aqueous slurry from which is prepared the initial fibrous web, there is an insufficient retention of the gypsum microfibers on the sheet-forming or mat-forming screen to yield an integral sheet or mat of the gypsum microfibers. Generally, the cellulosic microfiber retention aid or binder is used in an amount of at least about 10% by weight of the gypsum microfiber component, and more usually at least about 30%. However, in order to maximize the heat retarding or heat resisting property of the sheet or mat, the weight ratio of cellulosic microfiber retention aid or binder to gypsum microfibers should be less than about 1.0 to 1.3, and more preferably is less than about 1.0 to 1.5. Particularly preferred are sheets or mats prepared at a weight ratio of cellulosic microfiber retention aid or binder to gypsum microfibers of less than about 1.0 to 2.0.

The cellulosic microfiber retention aid or binder may be cellulose fibers prepared from one or more species of wood or vegetable pulp in any desired degree of refining or bleaching. Processes for preparing cellulose fibers are well-recognized by those skilled in the art of paper-making. Cellulose pulp suitable for use in a paper-making application will generally be suitable for use in the present invention. The cellulosic fibers may be Kraft pulp fibers such as disclosed in U.S. Pat. No. 2,773,763 to Scott (mineral fiber board), the disclosure of which is hereby incorporated by reference. See also the cellulosic fibers disclosed in U.S. Pat. No. 3,562,097 to von Hazmburg which incorporates mineral fibers in a paper designed especially for the paper cover sheets of gypsum wallboard, the disclosure of which also is hereby incorporated by reference. As an alternative, the cellulosic fibers may be substituted by a non-fibrous cellulosic gel binder such as those disclosed in U.S. Pat. No. 3,494,824 to Roberts and U.S. Pat. No. 3,952,130 to Nason, the disclosures of which are hereby incorporated herein by reference. The cellulosic microfiber retention aid or binder may also be a modified cellulose product such as carboxymethylcellulose, methylcellulose or the like.

The optional, although preferred, other inorganic fiber, e.g., glass fiber, component of the gypsum microfiber paper functions to reduce cracking and spalling of the sheet material or mat when it is exposed to high temperatures. The glass fiber length may range from two inches down to, conceivably, the millimeter level. It is preferred to use drawn textile glass fibers of the type described in U.S. Pat. Nos. 2,681,863 and 2,744,022 to Croce and Shuttleworth. The manufacturing and functional improvements and advantages obtained by utilizing such glass fibers relative to blown glass fibers or other natural synthetic fibers are described in the aforesaid Croce/Shuttleworth patents, the disclosures of which, as they relate to the description of the drawn textile glass fibers, are incorporated herein by reference.

Briefly described, the drawn textile glass fibers are produced as continuous individual filaments having a diameter of, for example, about 0.0002 to 0.001 inch. Individual fine filaments are grouped into strands having from 100 to several hundred individual filaments which are protectively coated to prevent abrading between grouped filaments. Preferred glass fiber strands for use in this invention comprise those which have been coated with a relatively weak bonding type material, such as, for example, starch or other water softenable or soluble coating material.

Prior to combining the loosely bonded textile glass fibers with the other components they are preferably cut into short lengths, such as, for example, about $\frac{1}{2}$ to about 1 inch, providing short sections or bundles of fibers. Upon adding the short sections or bundles of the fibers to the aqueous slurry composition from which the gypsum microfiber sheet material or mat is formed, the bonding or coating material softens or dissolves. As the slurry is mixed, the glass fibers which comprise the bundle typically are separated into individual filaments which are completely dispersed in the slurry.

The general procedure for manufacturing the gypsum microfiber sheet material or mat of the present invention involves techniques similar to those heretofore employed in the paper-making art or in the art of making wet-laid nonwoven mats.

Laboratory production using standard handsheet procedures and pilot scale experiments have demonstrated that the sheet material can be produced on conventional Fourdrinier paperboard machines. Accordingly, a slurry containing a mixture of the water-insoluble gypsum anhydrite micro fibers, the cellulosic micro fiber retention aid or binder and optionally glass fibers is initially prepared. Generally, the slurry is prepared at a consistency (solids concentration) of between about 0.05 and 2.0%. The relative amounts of gypsum microfibers, cellulosic microfiber retention aid or binder and optional glass fibers in the slurry are within the limits previously discussed. Because the gypsum microfiber carries an anionic electrostatic charge from pH of about 5 to about 8, other conventional filler retention and drainage aids also may be included in the fiber slurry to facilitate the production of useful material. See also, Kirk-Othmer Encyclopedia of Chemical Technology, 3rd Edition, Vol. 16, John Wiley & Sons publisher, N.Y., N.Y., (1981), pp. 768–825 (re: Paper and Paper-making Additives) for other possible paper additives. Generally, lower consistencies lead to better web formation on the paper machine.

The slurry then is pumped to the headbox of the paper machine and distributed from there onto the moving wire. In typical practice, the wire may be moving at a linear speed of from about 10 to 1000 m/min. Speeds of about 10 to 100 m/min often may be more suitable. Continuous sheet formation and drying conveniently can be carded out using known paper-making equipment including the cylinder, Fourdrinier (i.e. single wire) and twin wire machines. In the former, a wire covered cylinder is mounted in a vat containing the fiber slurry. As the cylinder revolves, water drains inwardly through the screen forming the paper web on the outside of the cylinder. The wet web is removed at the top of the cylinder, passes through press rolls for additional water removal, and then is passed over normally steam-heated, cylindrical drying drums. In the Fourdrinier machine, initial web dewatering is done on a long continuous synthetic fiber or wire screen. The partially dewatered web at the end of the wire then is directed to the press and dryer sections as in the cylinder machine. Finally, the twin-wire machine uses two opposing wires that accentuate initial dewatering by pressure. The two wires with the slurry between are wrapped around a support such as a cylinder so that tension in the outer wires compresses the slurry and causes water to drain through the wires. Further pressing and drying then can be carded out as above. Generally, the sheet or web leaving the wet end of the paper machine, i.e. before final pressing and drying, will have a consistency of about 18 to 25%.

In some instances, it may be desireable to produce the gypsum microfiber sheet with more loft than one realizes using standard paper-making techniques. This is readily accomplished using wet process, non-woven mat forming procedures. The fiber slurry, prepared in essentially the same way as if making paper, is applied to a moving wire screen where, normally by means of vacuum, a majority of the water is removed from the forming web. After web formation, an additional binder may optionally be applied to the web to strengthen the ultimately formed mat. Such binders may include acrylic polymers and copolymers, lattices of styrene-butadiene copolymers, polyvinyl chloride, starch and the like. Thereafter, the fibrous mat is passed through a dryer or oven to evaporate the bulk of the residual water and for setting any optional binder.

Because of the paper-like qualities of the sheet material or non-woven mat, intumescent or other fire-retardant agents might be incorporated through wet-end addition, saturating, or coating steps. Indeed, the material itself could provide the support for a barrier coating composition of a filled flexible polymer-based composition, such as a phenolic, making possible the production of multi-layer fire barrier composites.

Depending on the formation process and the relative proportion of gypsum microfibers, cellulosic microfiber retention aid or binder and optional glass fibers, the flexible gypsum microfiber sheet or mat of this invention will have a basis weight between about 5 and 100 grams per square feet (54 to 1076 grams per square meter), and more usually between about 10 and 75 grams per square feet (108 to 807 grams per square meter).

The gypsum microfiber sheet material or mat of the present invention is sufficiently flexible to be stored in roll form without cracking. The rolls can be handled readily and the product resists tearing allowing for easy processability and application.

The gypsum microfiber sheet or mat insulation layer of the present invention serves to impede heat transfer from a flame source and keeps radiant heat flux below the level necessary to ignite the covered or protected flammable substrate or below the level necessary to melt any radiant reflective layer that may be included in an overall fire barrier system designed to protect the substrate. Microscopic evaluation, after burn tests (Meeker burner laboratory tests and full-scale UL-790 simulations), of samples of paper-like sheet material comprising gypsum microfibers, cellulose fibers and glass fibers revealed that the cellulose had either carbonized or vaporized leaving a delicate veil of gypsum microfiber of low density and contact area which apparently provides the excellent insulation properties observed using the material. The included glass fibers were seen to have melted in those regions exposed to the highest temperatures and seem to have functioned thereafter as a binder holding the sheet or mat together since cracking was observed to have been reduced significantly or eliminated altogether in sheet material having included glass fibers. Without the glass fiber, the performance of a fire resistant barrier system including the gypsum microfiber paper was somewhat degraded because of cracking in the micro-insulative layer.

The microfiber component functions to reduce cracking and spalling of the composite barrier system when it is exposed to elevated temperatures, including temperatures at which the glass fiber component loses its functional properties as it melts away. In this connection, the microfibers can continue to function at temperatures as high as 1900° F. or more which is about 600° F.–1100° F. higher than the temperature at which glass fibers lose their effectiveness.

The gypsum microfiber heat insulating material was evaluated against products made with larger mineral fibers (e.g. rockwool fibers) and against products made with other inorganic fillers. The advantages of the microinsulation layer relative to the large mineral fiber products seems to be related to its micro-scale. The advantages over other micro-scale inorganic fillers and insulation materials, such as clay-filled paper for example, seems to be due to the lower density and lower contact area for the microfiber. In any case, the increase in fire-resistance for the barrier system employing the sheet material was beyond expectations and plays a major role in providing a barrier system that is lightweight, flexible, and low cost. In some instances, the micro-insulation may itself be sufficient to allow adequate fire resistance without either an additional barrier coating or any radiant reflective layer.

The gypsum microfiber paper utilized herein fills the void created by the withdrawal of asbestos due to the adverse health risks posed by asbestos. Surprisingly, in contrast to the gypsum boards now in use, the gypsum microfibers in the micro-insulation layer of the present invention provides an excellent and substantial enhancement of the fire resistant properties of fire retardant barrier systems. As noted in U.S. Pat. No. 5,001,005 to Blanpied, glass microfiber use also is discouraged due to the possible serious health hazards. The gypsum microfibers do not pose such a health hazard, and so the gypsum microfiber paper of the present invention provides an alternative to asbestos in the manufacture of flexible, flame resistant sheet material.

EXAMPLES

In order to facilitate a more complete understanding of the invention, a number of Examples are provided below. However, the scope of the invention is not limited to specific embodiments disclosed in these Examples, which are for purposes of illustration only.

EXAMPLE 1

Gypsum Microfiber Paper Preparation

In this example, standard hand-sheet methods were used to prepare gypsum microfiber, glass fiber-filled cellulose papers.

The procedure involved preparation of a dilute glass fiber slurry using chopped strand glass fibers and other additives used in the glass mat process. After fiber bundled breakup, a quantity of cellulose fiber was added to serve as a cellulosic microfiber retention aid or binder for the paper system. The gypsum microfibers were added to the slurry immediately prior to filtering the glass-cellulose slurry through the paper forming screen in a 12×12 inch filter box (deckle).

More specifically, the hand-sheet method was as follows. The lab preparation of gypsum microfibers/cellulose fiber and gypsum microfibers/cellulose fiber/glass fibers composites were made on a Noble and Wood Hand-sheet set up having a 100 mesh stainless steel monel wire filter. Once the slurries were placed in the filter, they were pressed against this wire mesh at conditions to give approximately 250 psi static force. After draining, the pressed sheets were dried at 220° F. for about 45 seconds.

Three different stocks were prepared. The first was the fiber glass stock in which about 10 drops (about 0.5 grams) of Katapole ™ VP-532 available from GAF Corp., N.Y., N.Y. (a cationic surfactant) were added to about one gallon of deionized water (Ph about 7.8). Thereafter, the desired quantity of half-inch glass fiber was added to this mixture and mixed with a high-speed mixer (Steadfast Stirrer Model SL 1200, Yamato Scientific Co., Ltd., Japan). The glass fiber used was PPG 2035 glass fiber available from PPG Industries, Pittsburgh, Pa., which is of E-glass and has an average fiber diameter of about 15 microns with the fibers sized with mineral oil and starch. Thereafter, about 32 ml of a 0.25% Dow Sepran ™ polyacrylamide thickener, available from Dow Chemical Co., Midland, Mich., was added. The resulting mixture was agitated vigorously for about ten minutes.

The second stock preparation was that of the gypsum microfiber. About two drops (about 0.1 grams) of Katapole ™ VP-532 was added to about 800 ml of deionized water. The gypsum microfibers (available from Georgia-Pacific Corporation) were added slowly while agitating and continuing to stir for about ten minutes. The gypsum microfibers are identified as SA standing for super anhydrite. The fiber widths ranged from about 0.2 to about 2 microns with an average of about 0.5 microns. The fiber lengths ranged from about 5 to about 300 microns with an average length of about 42 microns. The microfibers were produced from calcined calcium sulfate with the final product having a molecular weight of about 136 and a specific gravity of about 2.96.

The cellulose pulp stock preparation utilized 100% bleached soft wood Kraft pulp. The soft wood Kraft pulp was refined to about 400 CSF in a 12-inch single-disc refiner (12" Disc Mill available from Andritz Sprout-Bauer, Inc., Muncy, Pa.). "CSF" stands for Canadian Standard Freeness, see TAPPI T-227 OM 85. The Ph of this stock was about 7.0. The pulp stock (about 3% by weight consistency [i.e.percent solids]) was added to the glass slurry immediately prior to sheet formation or directly to the deckle box for those samples containing no glass fiber.

During the sheet forming procedure, the components were added to the deckle box containing one-third full volume of softened water (Ph of about 7.8). The deckle box was brought to full volume if necessary with additional water. The consistency of the slurry was about 0.005 to about 0.01% by weight. After agitating by hand for approximately 15 seconds and then allowing about one second for settling, the deckle was drained. The sheet with the wire mesh was removed from the deckle frame and covered with two sheets of Sloan 100# Verigood ™ Blotter paper, available from Sloan Paper Co., Atlanta, Ga. This was pressed between two layers of a wool felt. The sheet was couched off the wire with the blotter paper and once removed from the blotter, the sheet was fed onto a Noble & Wood rotary drum dryer. The dryer has a heated drum with an absorbent cloth belt to allow water vapor passage and to retain the formed sheet during drying against the heated drum. The number of passes, i.e., revolutions of the drum, depends on the temperature thereof and the desired dryness of the resulting paper product. The sheets were weighed without trimming to determine mass balance.

Using the foregoing procedure, various compositions of gypsum microfiber/cellulose fiber-based paper for use in fire resistant underlayments were prepared. These compositions are identified in Table 1 wherein the glass fibers, cellulose pulp fibers, gypsum microfibers, and other additives are identified and the ultimate grams per square foot of paper indicated. The weights applied did not always equal the charged solids. This may be due to water retention or to loss of materials such as the microfibers. However, this does not detract from the fact that these gypsum microfiber-containing papers substantially enhanced the performance of the barrier system in a variety of embodiments. Further, please note that paper no. 16 in Table 1 indicates that no product was made. Without cellulose pulp fiber addition (i.e., cellulosic microfiber retention aid or binder) no gypsum micro fibers were retained on the forming wire or screen. The cellulose fibers, the addition of a cellulosic gel binder or the addition of a modified cellulose product such as carboxymethylcellulose is necessary for binding the inorganic fibers and microfibers in standard paper sheet formation. Alternatively, though not preferable, other synthetic binders may be utilized. The use of such binders may require a higher loading which decreases the flame retardancy of the resulting microfiber paper.

TABLE 1

| | Composition of Cellulose Fiber-Based Paper for Use in Fire Resistant Underlayment | | | | |
|---|---|---|---|---|---|
| PAPER NUMBER | GLASS (g) | PULP (g) | GYPSUM MICROFIBERS (g) | OTHER (g) | GRAMS/SQ. FT. OF PAPER |
| 1 | 6 | 6 | 0 | 0 | 13.4 |
| 2 | 6 | 6 | 0 | 0 | 10.75 |
| 3a | 6 | 6 | 0 | 0 | 13.50 |
| 3b | 6 | 6 | 0 | 0 | 12.75 |
| 4 | 3 | 6 | 3 | — | 12.4 |
| 5 | 4 | 5 | 3 | — | 11.8 |
| 6 | — | — | — | — | — |
| 7 | 3 | 3 | 5 | — | 8.6 |
| 8 | 3 | 2 | 6 | — | 13.2 |
| 9 | 3 | 3 | 6 | — | 11.6 |
| 10 | 3 | 3 | 6 | — | 12.0 |
| 11 | 3 | 3 | 6 | — | 10.4 |
| 12a | 6 | 6 | 12 | — | 19.96 |

TABLE 1-continued

Composition of Cellulose Fiber-Based
Paper for Use in Fire Resistant Underlayment

| PAPER NUMBER | GLASS (g) | PULP (g) | GYPSUM MICRO-FIBERS (g) | OTHER (g) | GRAMS/ SQ. FT. OF PAPER |
|---|---|---|---|---|---|
| 12b | 6 | 6 | 12 | — | 22.00 |
| 12c | 6 | 6 | 12 | — | 21.9 |
| 12d | 6 | 6 | 12 | — | 21.2 |
| 13a | 0 | 4 | 8 | — | 8.63 |
| 13b | 0 | 4 | 8 | — | 8.90 |
| 14a | 0 | 4 | 8 | — | 8.29 |
| 14b | 0 | 4 | 8 | — | 8.50 |
| 15 | 0 | 4 | 15 | — | 12.3 |
| 16 | 6 | 0 | 8 | — | No. Prod. |
| 17a | 0 | 4 | 6 | 4 $CaCO_3$ | 9.5 |
| 17b | 0 | 4 | 6 | 4 $CaCO_3$ | 10.40 |
| 18a | 0 | 4 | 6 | 4 $Al(OH)_3$ | 11.40 |
| 18b | 0 | 4 | 6 | 4 $Al(OH)_3$ | 11.40 |

The foregoing hand-sheet method is a fairly standard preparation technique which is amenable to scale-up to pilot and commercial paper making volumes and sizes.

Regarding the compositions in Table 1, it was observed that slow drainage occurred in the heavier weight samples and those containing significant quantities of microfiber (Sample sets 12, 13 and 14). The samples drained similarly to board grades of a weight of approximately 40 pounds/1,000 square feet suggesting that the sheet would probably have to be run on a fairly slow machine, such as conventional Fourdrinier, cylinder machine, non-woven formers, and the like. Charge analysis using Straydin's electrophoretic mobility meter (Designated Charge Analyzer available from SKS Associates, Milford, Conn.) indicated that the gypsum microfibers were anionic at these neutral pH's. Accordingly, cationic retention also aids may be employed to improve retention of the microfibers. An example of such retention aids is Percol 231L high molecular weight cationic polyacrylamide available from Allied Colloid. One surprising observation was the physical integrity of the sheets of sample set No. 14.

It was further observed that incorporation of the gypsum micro fibers and other fillers, such as $CaCO_3$ and aluminum trihydrate, into the papers can be accomplished with reasonable efficiencies. The use of a slurry flitrate recycle in combination with retention aids should result in an efficient fire retardant paper producing process. Microscopic examination of gypsum microfiber-filled papers after cellulose burn-off demonstrated that the microfibers remained intact and in the form of a well-dispersed veil formation well-suited for efficient insulation (thermal heat transfer being minimal due to the small contact area afforded by the fiber crystal array). It was also observed that the presence of glass fibers was required to prevent crack formation and spreading as the microfiber veil formed on cellulose pyrolysis and burnoff.

EXAMPLE 2

Performance of Microfiber Paper in Burn Tests

Figure 3:
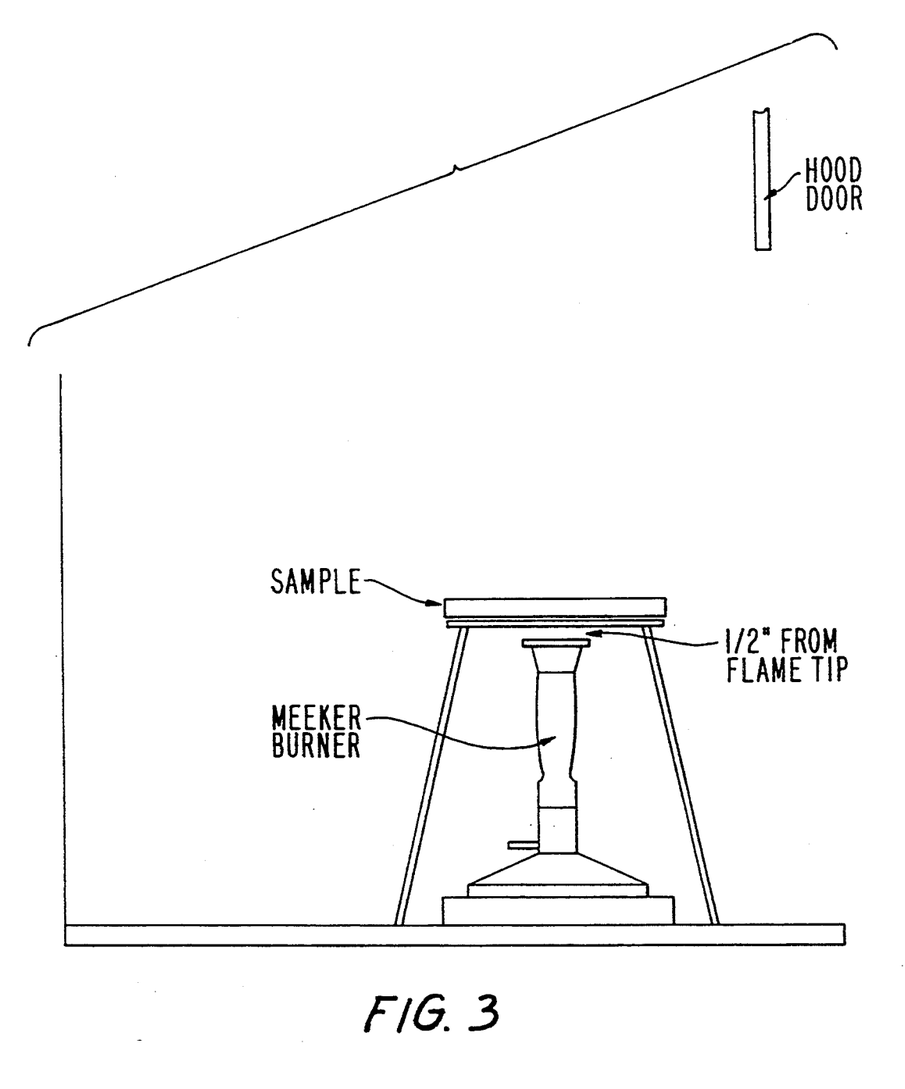
FIG. 3 is a pictorial side-elevation of a laboratory simulation test apparatus.

In this example, the fire barrier performance of the underlayment was measured utilizing the following method; see FIG. 3. The barrier system was laid up on a 6 inch by 6 inch by ½ inch 4-ply plywood board (Southern Pine). The board was placed onto a ringstand with barrier side down and subjected to a Meeker Burner heat source (about 2,200° F.) at a ¼ inch distance. An individual test is terminated when a hole has charred through the top layer of the plywood deck. The performance of the system was determined by burn-through time (the time duration required for char-through of the board). Various underlayment compositions and configurations were prepared utilizing several of the microfiber paper compositions of Table 1. The results for these microfiber paper-containing barriers are presented in Table 2. The best system provided a three times increase in burn-through time over the simple phenolic-glass mat barrier (sample deck Nos. 3 and 16 are identified as control). These data clearly demonstrate the synergism possible by the combination of the microfiber paper and aluminum foil with a base phenolic-glass mat barrier (standard coated mat; prepared by coating a 1.5 pounds per 100 square feet U-F bonded glass mat obtained from Owens-Corning Fiberglass with a clay-filled phenol-formaldehyde resole resin-based coating composition).

The use of aluminum foil in combination with the microfiber paper and the standard coated glass mat increased the time to char-through on an average of about seven minutes. [n=8, x (i.e., average)=7.04, s=2.01].

As noted above, paper systems that contained glass fibers tended to increase time to char-through over papers which contained cellulose pulp only. The effectiveness of the gypsum microfiber veil to inhibit heat transfer allows the use of an aluminum foil reflector to enhance further the radiant heat transfer inhibition from the heat source to the wooden deck substrate. Further, this paper making process provides a convenient means for creating a commercially feasible microfiber layer in combination with other barrier requirements.

TABLE 2

Deck Compositions of Underlayment Test

| DECK NO. | DECK COMPOSITION | TIME TO CHAR THROUGH DECK (Min.) |
|---|---|---|
| 1 | Plywood Aluminum Foil Paper #1 standard Coated Mat | 18.02 |
| 2 | Plywood Paper #1 Standard Coated Mat | 11.44 |
| 3 (Control) | Plywood Standard Coated Mat | 7.48 |
| 4 | Plywood Aluminum Foil Paper #4 Standard Coated Mat | 20.08 |
| 5 | Plywood Paper #4 Standard Coated Mat | 13.49 |
| 6 | Plywood Aluminum Foil Paper #12a Standard Coated Mat | 24.18 |
| 7 | Plywood Paper #12a Standard Coated Mat | 14.04 |
| 8 | Plywood Aluminum Foil Paper #13a Standard Coated Mat | 17.40 |
| 9 | Plywood Paper #13a Standard Coated Mat | 10.52 |
| 10 | Plywood Aluminum Foil Paper #15 Standard Coated Mat | 17.16 |

TABLE 2-continued

Deck Compositions of Underlayment Test

| DECK NO. | DECK COMPOSITION | TIME TO CHAR THROUGH DECK (Min.) |
|---|---|---|
| 11 | Plywood<br>Paper #15<br>Standard Coated Mat | 13.11 |
| 12 | Plywood<br>Aluminum Foil<br>Paper #17b<br>Standard Coated Mat | 22.08 |
| 13 | Plywood<br>Paper #17b<br>Standard Coated Mat | 12.25 |
| 14 | Plywood<br>Aluminum Foil<br>Paper #18a<br>Standard Coated Mat | 19.45 |
| 15 | Plywood<br>Paper #18a<br>Standard Coated Mat | 13.14 |
| 16 (Control) | Plywood<br>Standard Coated Mat | 8.36 |
| 17 | Plywood<br>Aluminum Foil<br>Paper #12b | Failed at 7.28 |
| 18 | Plywood<br>Aluminum Foil<br>Paper #10<br>Standard Coated Mat | 19.25 |
| 19 | Plywood<br>Paper #10<br>Standard Coated Mat | 13.29 |

Controls 3 & 16 are equivalent. Deck No. 17 was tried without a standard control mat to demonstrate that without an oxygen barrier, the system chars through quickly.

A clay-filled phenolic coated glass mat provides a heat-oxygen barrier due to the formation of a monolithic ceramic clay once subjected to high temperature. This system is preferred for the performance of the system, but fails to provide complete flame retardant protection due to the high heat conductivity inherent in the monolithic ceramic. Insertion of a gypsum microfiber paper behind the primary barrier provides a highly effective low thermal conductivity barrier which impedes heat transfer from the flame source due to the fibrous nature of the microfiber array (low density with low contact area for heat transfer). Further, the insertion of the aluminum foil between the microfiber paper and the wood substrate is possible since the microfiber barrier maintains the heat flux below the level required to melt the aluminum foil (approximately 1,200° F.). The aluminum foil increases system efficiencies since it reflects back a high percentage of the radiant component of the flame front.

EXAMPLE 3

Correlation-UL-790 Class B and Meeker Burner Tests

These data are related to the data presented in Table 2 in that they assess performance of the microfiber paper in a number of fire barrier configurations. The data in this section focus on evaluation of only a single paper composition under a wide range of test conditions. The microfiber paper composition was a duplicate of papers 12a, b and c from Table 1. The Meeker burner results for a number of configurations are presented in Table 3.

TABLE 3

SUMMARY: UNDERLAYMENT COMPOSITIONS AND BURN THROUGH TIMES FOR Meeker BURNER TEST TO EVALUATE CANDIDATE GYPSUM MICROFIBER COMPOSITION

| Deck* No. | Deck Composition | Time To Char Through Plywood Test Sample (Min.) |
|---|---|---|
| 1 | Plywood<br>Standard Coated Mat | 11.0 |
| 2 | Plywood<br>Coated Mat<br>(2 side coated) | 11.75 |
| 3 | Plywood<br>Microfiber paper**<br>Coated Mat<br>(2 side coating) | 15.50 |
| 4 | Plywood<br>Microfiber paper***<br>Coated Mat<br>(2 side coated) | 20.0 |
| 5 | Plywood<br>Standard mat<br>Microfiber paper | 13.0 |
| 6 | Mat and paper<br>reused from samples[?]<br>with aluminum foil inserted<br>next to plywood | 22.75 |
| 7 | Plywood<br>Aluminum foil<br>Microfiber paper<br>Standard mat | 34.0 |
| 8 | Plywood<br>Foil<br>Microfiber paper<br>Mat (2 side coated)<br>The assembly was bonded with chloroprene rubber emulsion | 20.5 |

*Deck in Meeker Burner Test Describes 6 × 6 × ½ inch plywood Sample plus fire barrier system heated using a 2200° F. Meeker Burner Flame.
From Microfiber/glass/cellulose = 12/6/6 grams paper with final sheet weight = 19 grams.
***Paper and coated mat reused from test 3 mat and paper have had combustibles burned out.

From the foregoing, it is apparent that there is not much difference between 1-side and 2-side coated mats. Further, in this test the embodiment of the mat plus microfiber paper gave only marginal improvement in char-through times. The addition of the aluminum foil reflector to the mat-paper system provided a major improvement in burn-through performance. However, saturating paper with phenolic or adhesive leads to a lowering of system burn through performance.

U.L. 790 SIMULATION

The U.L. 790 Class B test procedure was duplicated using deck configurations similar to a number of the preceding Meeker Burner tests. The effect of including Alcoa, Country Cedar Aluminum Shakes in these assemblies was also assessed. Deck compositions and char through times are provided in Table 4.

TABLE 4

UL-790 CLASS B BURN TEST SIMULATIONS

| Deck No. | Deck Composition | Comment |
|---|---|---|
| 1 | Plywood Deck<br>Aluminum Reflector<br>Microfiber paper* | Failed at 6-7 minutes |
| 2 | Plywood Deck<br>Aluminum Reflector<br>Microfiber paper<br>Mat - 2 Side Coated | Failed at 6-7 minutes |
| 3 | Plywood Deck<br>Aluminum Reflector | Passed test at 20 minutes |

TABLE 4-continued

UL-790 CLASS B BURN TEST SIMULATIONS

| Deck No. | Deck Composition | Comment |
|---|---|---|
| 4 | Microfiber paper<br>Mat - 2 Side Coated<br>Aluminum .016 sheeting<br>Plywood<br>Aluminum Reflector<br>Microfiber paper<br>Standard Mat<br>Alcoa Shake | Passed at 14.75 minutes |
| 5 | Plywood<br>Microfiber paper<br>Standard Mat<br>Aluminum Shakes | Passed at 90 minutes |
| 6 | Plywood<br>Microfiber paper<br>Sheet 15 pound roofing felt<br>Aluminum Shake | Passed at 90 minutes |

*Microfiber/glass/cellulose = 12/6/6 grams paper with final sheet weight = 19 grams For the above test, thermocouples were placed in the seam between the plywood sheets and on top of the plywood decking in the test bed deck top area directly below the center of the brand placement position. Maximum temperatures observed for the respective thermocouples are presented in Table 5 for the above runs.

TABLE 5

MAXIMUM TEMPERATURES FOR DECK SURFACE (TOP AND INSEAM) DIRECTLY BELOW UL-790 CLASS B BRAND

| Deck No. | Temp Max °F. In Seam | Temp Max °F. On Wood Deck Surface |
|---|---|---|
| 1 | 1300 | >2000 |
| 2 | 1100 | >2000 |
| 3 | 500 | 980 |
| 4 | 340 | 580 |
| 5 | 1000 | 1400 |
| 6 | 1140 | 1900 |

From the foregoing, it is apparent that the combination of aluminum foil, microfiber paper and phenolic mat gave the best fire barrier results based on observed wood deck surface and inseam temperatures. Further, the aluminum shake shingle clearly plays a major role in achieving desired Class B fire test performance. Burn tests on decks 1 and 2 clearly failed. The removal of the aluminum reflector led to increased char and deck temperature. Surprisingly, the microfiber paper in combination with 15 pound roofing felt appears capable of passing UL 790 Class B with the Aluminum Shake system.

EXAMPLE 4

Figure 2A:
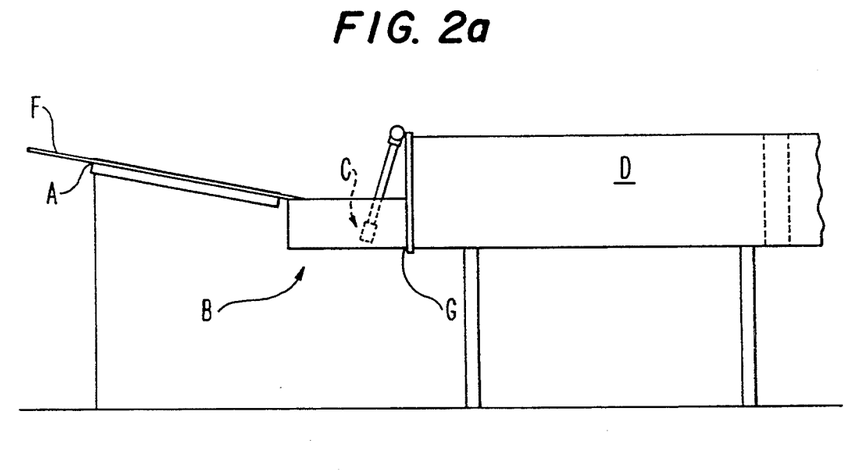
FIGS. 2a and 2b are a side view and a top view, respectively, of an apparatus used for the UL-790 tests.
Figure 2B:
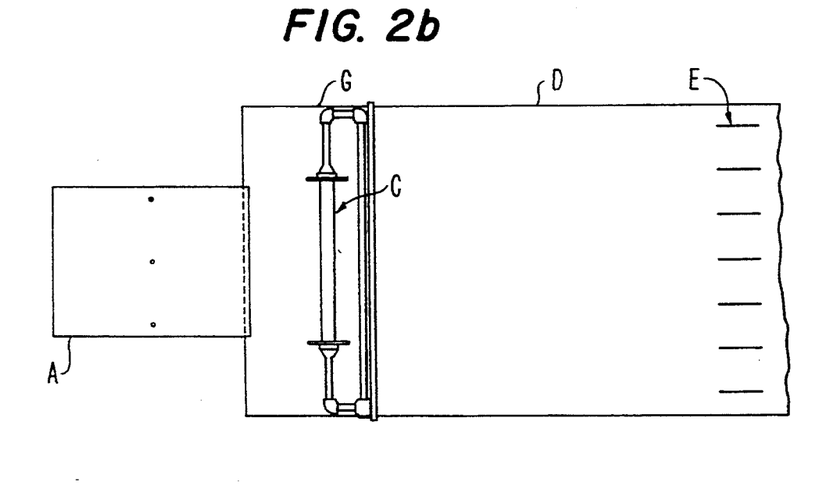

In this example, combinations of the standard phenolic-glass mat and gypsum microfiber paper were subjected to the UL-790 Class B test at Underwriters Laboratories (See FIGS. 2a and 2b). Results from these tests are presented in the following table (Table 6).

As is apparent from the table, the standard coated mat underlayment in combination with two sheets of the gypsum microfiber paper can pass the UL-790 Class B roofing burn test in combination with a Stolle aluminum shake. Further, the standard coated mat in combination with an aluminum reflector and the gypsum microfiber paper (1 piece) passed the Class B test with much less roofing degradation than the above system and is thus a much more efficient system. Surprisingly, two layers of 15 pound roofing felt in combination with 2 layers of the gypsum microfiber paper passed the UL-790 Class B test in combination with the Stolle aluminum shake roofing system. This represents a very low cost lightweight roofing system. This data clearly show the value of the microfiber paper in achievement of effective light weight fire barrier systems.

It will be noted that the simple underlayment plus 1 layer of paper did not pass the UL test at Underwriters Laboratories, but did pass in the UL-790 test simulation. This difference is believed to be due to the maintenance of the coals in the UL (Underwriters Laboratories test). (The full-scale UL 790 simulation used a normal blade fan. The UL 790 test at Underwriters Laboratories used a fan that blew into a chamber to produce a laminar air flow.) The UL simulation appears to blow them out faster. The big differences in deck surface and inseam temperatures observed in the UL simulation clearly show the relative merits of the present invention in its various fire barrier embodiments. The reflector, microfiber paper, single coat mat system was a superior performer in both tests, i.e. the actual and simulated UL tests. It is interesting to note that the Underwriters Laboratory test clearly demonstrated the merit of using a double thickness of the microfiber paper. In view of the foregoing results with the following embodiments:

(1) 2 layers microfiber paper + the standard mat;
(2) 1 layer aluminum reflector + 1 layer microfiber paper + the standard mat; and
(3) 2 layers microfiber paper + roofing felt;

it is believed that the following embodiment would also be acceptable:

(4) 1 layer aluminum reflector + 1 layer microfiber paper + roofing felt.

Other embodiments contemplated include the use of microfiber paper coated on one side with phenolic and/or clay-filled phenolic and the use of microfiber paper as a substrate for asphalt or rubberized asphalt.

TABLE 6

UL-790 CLASS B RESULTS

| Deck No. | Deck Composition | Comments |
|---|---|---|
| 1 | Plywood Deck<br>Gypsum Microfiber paper<br>Standard Coated Mat (One Side)<br>Stolle Aluminum<br>Shake Roofing Panel | Failed at 19.75 minutes |
| 2 | Plywood Deck<br>Gypsum Microfiber paper<br>2 Standard Coated Mat (Back to Back configuration)<br>Stolle Aluminum<br>Shake Roofing Panel | Failed at 5.50 minutes |
| 3 | Plywood Deck<br>2 Gypsum Microfiber papers<br>Standard Coated Mat (One Side)<br>Stolle Aluminum Shake Roofing Panel | Passed; still smoke at 90 minutes |
| 4 | Plywood Deck<br>1 layer National Home Shelter Product<br>Stolle Aluminum Shake Roofing Panel | Failed at 11.0 minutes |
| 5 | Plywood Deck<br>3 Gypsum Microfiber papers<br>Standard Coated Mat (one side)<br>Stolle Aluminum Shake Roofing Panel | Failed UL.790 Class A at 11.50 minutes |
| 6 | Repeat of Deck 3 | Passed at 60 minutes |
| 7 | Plywood Deck<br>Aluminum Reflector<br>Gypsum Microfiber paper<br>Standard Coated Mat<br>Stolle Aluminum Shake Roofing Panel | Passed at 14.0 minutes |
| 8 | Plywood Deck<br>Gypsum Microfiber paper (2 layers)<br>15 pound Roofing Felt (2 layers) | Test stopped at 35.0 minutes; would have |

TABLE 6-continued

UL-790 CLASS B RESULTS

| Deck No. | Deck Composition | Comments |
|---|---|---|
| | Stolle Aluminum Shake Roofing | passed. |

EXAMPLE 5

Pilot Scale Paper Trials

Flexible gypsum microfiber paper was prepared on a ¼th scale Fourdinier paper machine. The slurry fed to the headbox of the paper machine contained a mixture of cellulose fibers, glass fibers and water-insoluble gypsum anhydrite fibers at a consistency of about 1%. Gypsum microfiber retention appeared to be in excess of 90%. A total of 23 paper rolls were produced at an average weight of 200 pounds per roll. Paper rolls 1-9 and 13-23 were prepared using a slurry containing about 25% bleached Kraft pulp which had been refined to about 600 CSF (Sprout Waldon 12" Twin Flow refiner), about 25% 0.5 inch long glass fibers and 50% gypsum anhydrite microfibers. Paper rolls 10-12 were prepared at 20% of the same bleached Kraft pulp about 13% of the same 0.5 inch glass fibers and about 67% gypsum anhydrite microfibers. The basis weight of the paper prepared in the trial varied between about 20 and 60 grams per square foot (215 and 645 grams per square meter).

Samples of the paper prepared in this trial were tested using the Meker burner test described above. According to this method, a 6 inch by 6 inch by ½ inch 4-ply exterior grade plywood board (Southern Pine) was covered with a barrier consisting of a sheet of aluminum foil covered with the standard glass mat (prepared as in Example 2). The board was placed onto a ring-stand with the barrier side down and subjected to a Meeker Burner heat source (about 2,200° F.) at a ¼ inch distance. An individual test is terminated when a hole has charred through the top layer of the plywood deck. The performance of the system was determined by burn-through time (the time duration required for char-through of the board). The microfiber paper was tested by placing the paper between the standard coated glass mat and the aluminum foil. Results are reported in Table 7. The standard handsheets were prepared using the procedure of Example 1.

TABLE 7

| SAMPLE NUMBER | BARRIER DESCRIPTION | PAPER THICKNESS (INCHES) | PAPER WEIGHT (GRAMS/FT$^2$) | BURN THROUGH TIME (MIN) |
|---|---|---|---|---|
| 1. | Standard Mat Standard Handsheet Aluminum Foil | 0.020 | 19.0 | 27.5 |
| 2. | Sheet Molding Compound | 0.11 | — | 15.5 |
| 3. | Standard Mat Trial Roll #7 Aluminum Foil | 0.049 | 47.6 | 40.5 |
| 4. | Standard Mat Trial Roll #4 Aluminum Foil | 0.058 | 47.4 | 48.3 |
| 5. | Standard Mat Trial Roll #10 Aluminum Foil | 0.047 | 52.2 | 55.42 |
| 6. | Standard Mat 2 Standard Handsheets Aluminum Foil | 0.040 | 39.0** | 37.39 |
| 7. | Standard Mat 2 Trial Handsheets Aluminum Foil | 0.040 | 36.0 | 41.4 |
| 8. | Standard Mat DuPont Flooring Sheet* Aluminum Foil | 0.050 | 95.0 | 19.2 |
| 9. | Standard Mat Trial Roll #3 Aluminum Foil | 0.044 | 48.8 | Test Void |
| 10. | Standard Mat Trial Roll #21 Aluminum Foil | 0.033 | 30.8 | 25.0 |
| 11. | Standard Mat Standard Handsheet Aluminum Foil | — | 18.5 | 37.4 |

*3 percent fiberglass, 15% NL 244-A Talc, 9% cellulose fibers.
**Sum of the two plies or sheets.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. A flexible gypsum microfiber sheet material or mat made by dewatering an aqueous slurry into a web and drying said dewatered web, wherein said aqueous slurry contains water-insoluble gypsum anhydrite microfibers and a cellulosic microfiber retention aid or binder selected from the group consisting of cellulose fibers, a cellulose gel, a modified cellulose product and mixtures thereof.

2. The flexible gypsum microfiber sheet material or mat of claim 1 wherein said aqueous slurry also contains glass fibers.

3. The flexible gypsum microfiber paper of claim 2 wherein said sheet material or mat contains 20 to 70% of said gypsum microfibers, from 10 to 30% cellulosic microfiber retention aid or binder and from 20 to 60% glass fibers.

4. The flexible gypsum microfiber sheet material or mat of claim 1 having a basis weight between about 10 and 75 grams per square foot.

5. The flexible gypsum microfiber sheet material or mat of claim 4 having a basis weight between about 8 and 22 grams per square foot.

6. The flexible gypsum microfiber sheet material or mat of claim 3 having a basis weight between about 5 and 100 grams per square foot.

7. The flexible gypsum microfiber sheet material or mat of claim 6 having a basis weight between about 8 and 22 grams per square foot.

8. The flexible gypsum microfiber sheet material or mat of claim 1 wherein said modified cellulose product is selected from carboxymethylcellulose and methylcellulose.

9. The flexible gypsum microfiber sheet material or mat of claim 6 wherein said modified cellulose product is selected from carboxymethylcellulose and methylcellulose.

10. The flexible gypsum microfiber sheet material or mat of claim 1 having a weight ratio of cellulosic microfiber retention aid or binder to gypsum microfibers of less than about 1.0 to 1.3.

11. The flexible gypsum microfiber sheet material or mat of claim 10 having a weight ratio of cellulosic microfiber retention aid or binder to gypsum microfibers of less than about 1.0 to 2.0.

12. The flexible gypsum microfiber sheet material or mat of claim 6 having a weight ratio of cellulosic microfiber retention aid or binder to gypsum microfibers of less than about 1.0 to 1.3.

13. The flexible gypsum microfiber sheet material or mat of claim 12 having a weight ratio of cellulosic microfiber retention aid or binder to gypsum microfibers of less than about 1.0 to 2.0.

14. A method for producing a flexible gypsum microfiber sheet material or mat comprising forming a web by dewatering an aqueous slurry containing water-insoluble gypsum anhydrite microfibers and a cellulosic microfiber retention aid or binder selected from the group consisting of cellulose fibers, a cellulose gel, a modified cellulose product and mixtures thereof in an amount sufficient to form said web, and drying said web.

15. The method of claim 14 wherein said aqueous slurry also contains glass fibers.

16. The method of claim 15 wherein said aqueous slurry contains 20 to 70% of said gypsum microfibers, from 10 to 30% cellulosic microfiber retention aid or binder and from 20 to 60% glass fibers.

17. The method of claim 14 wherein said slurry contains a weight ratio of cellulosic microfiber retention aid or binder to gypsum microfibers of less than about 1.0 to 1.3.

18. The method of claim 17 wherein said slurry contains a weight ratio of cellulosic microfiber retention aid or binder to gypsum microfibers of less than about 1.0 to 2.0.

19. The method of claim 16 wherein said slurry contains a weight ratio of cellulosic microfiber retention aid or binder to gypsum microfibers of less than about 1.0 to 1.3.

20. The method of claim 19 wherein said slurry contains a weight ratio of cellulosic microfiber retention aid or binder to gypsum microfibers of less than about 1.0 to 2.0.

* * * * *

UNITED STATES PATENT AND TRADEMARK OFFICE
CERTIFICATE OF CORRECTION

PATENT NO. : 5,401,588
DATED : March 28, 1995
INVENTOR(S) : Chad E. Garvey, et al It is certified that error appears in the above-indentified patent and that said Letters Patent is hereby corrected as shown below:

On title page, item [75] Inventors, "Ted McC. McVay" should read —Ted M. McVay—

Signed and Sealed this

Eighth Day of August, 1995

Attest:

BRUCE LEHMAN

Attesting Officer  Commissioner of Patents and Trademarks